(12) United States Patent
Kotani

(10) Patent No.: US 7,433,079 B2
(45) Date of Patent: Oct. 7, 2008

(54) IMAGE PROCESSING APPARATUS AND METHOD

(75) Inventor: Takuya Kotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 10/865,793

(22) Filed: Jun. 14, 2004

(65) Prior Publication Data

US 2004/0263887 A1 Dec. 30, 2004

(30) Foreign Application Priority Data

Jun. 13, 2003 (JP) ............... 2003-169931
Jun. 13, 2003 (JP) ............... 2003-169932

(51) Int. Cl.
*H04N 1/58* (2006.01)
*H04N 1/60* (2006.01)

(52) U.S. Cl. ............ 358/1.9; 358/3.26; 358/3.27; 358/518; 358/532

(58) Field of Classification Search ......... 358/1.1, 358/1.9, 3.26, 3.27, 518, 532; 382/254, 274, 382/275

See application file for complete search history.

(56) References Cited

U.S. PATENT DOCUMENTS

| | | | | |
|---|---|---|---|---|
| 4,882,621 A | * | 11/1989 | Suzuki et al. ............... | 358/518 |
| 5,596,346 A | * | 1/1997 | Leone et al. ................ | 345/667 |
| 6,356,364 B2 | * | 3/2002 | Matsushiro et al. .......... | 358/1.9 |
| 6,529,918 B2 | * | 3/2003 | Takahashi .................. | 707/205 |
| 6,563,602 B1 | * | 5/2003 | Uratani et al. .............. | 358/1.9 |
| 2002/0034144 A1 | | 3/2002 | Kotani ..................... | 369/59.25 |
| 2003/0090690 A1 | * | 5/2003 | Katayama et al. ............ | 358/1.9 |

FOREIGN PATENT DOCUMENTS

| JP | 11-345321 | 12/1999 |
|---|---|---|
| JP | 2001-202509 | 7/2001 |

* cited by examiner

*Primary Examiner*—Thomas D Lee
(74) *Attorney, Agent, or Firm*—Fitzpatrick, Cella, Harper & Scinto

(57) ABSTRACT

Image correction requires experience, and an image cannot be desirably corrected by an inexperienced user. Automatic image correction is done based on the analysis result of a histogram or the like. More appropriate image correction can be applied in consideration of meta data in addition to information of an image itself. A CPU acquires additional information appended to image data input from an input device, and generates correction parameters on the basis of information upon image acquisition, which is indicated by the acquired additional information. One or more image processes are applied in a predetermined order using the generated correction parameters, thus correcting image data.

26 Claims, 15 Drawing Sheets

FIG. 4

Exif INFORMATION

MODEL
Eanon
Eanon DIGITAL CAMERA 200

PHOTOGRAPHING INFORMATION

| | |
|---|---|
| PHOTOGRAPHING MODE | Standard |
| SHUTTER SPEED | 1/100 |
| APERTURE VALUE | 14.0 |
| EXPOSURE CORRECTION VALUE | 1/3 |
| FOCAL LENGTH | 10.8mm |
| SUBJECT DISTANCE | 0.335m |
| FLASH | OFF |

CLOSE

IMAGE PROCESSING APPARATUS AND METHOD

FIELD OF THE INVENTION

The present invention relates to an image processing apparatus and method and, more particularly, to an image process that corrects an image.

BACKGROUND OF THE INVENTION

Digital cameras have prevailed rapidly, and personal computers (PC) are normally used at home. Images sensed by a digital camera are printed using a PC and a printer, and are published on a home page or the like. However, exposure and white balance of a digital camera are not always perfect, and image correction of an image is required before printing or publication in some cases. However, image correction requires experience, and the user who has little experience cannot desirably correct an image. For this reason, various automatic image correction methods have been proposed for inexperienced and unaccustomed users of image correction.

Automatic image correction is mainly done based on an analysis result such as the histogram of pixel values of an image. However, more appropriate image correction can be attained in consideration of meta data (additional information) in addition to information of an image itself. For example, image data compatible to Exif can record practical values such as a shutter speed, aperture value, and the like. Automatic image correction using such meta data is disclosed in, e.g., Japanese Patent Laid-Open No. 2001-202509. The invention described in this reference classifies noise reduction parameters according to the ISO speed, and determines parameters according to the ISO speed.

An image is not always sensed as a photographer intended. For example, an image which is darker than expected or an image which appears unsharp as a whole due to low sharpness by, e.g., camerashaking, is often obtained. When such an image is to be corrected, image processing software such as Adobe® PhotoShop® and the like can be used. Functions of PhotoShop® such as "brightness/contrast", "tone curve", "hue/saturation", "color balance", "unsharp mask", "edge emphasis", "blur", and the like are applied to an original image in an arbitrary order to correct the image. For example, arbitrary correction functions can be applied at arbitrary timings by, e.g., applying "color balance", applying "tone curve" to that result, and further applying "unsharp mask" to the result.

An image process applies various processes to an original image in turn. When a plurality of processes are applied in different orders, quite different correction results are normally obtained.

Since it is very troublesome to apply various correction functions, a method of presenting similar correction functions together in place of breaking up correction menu items may be used. Japanese Patent Laid-Open No. 11-345321 describes a method of presenting parameters associated with color tone correction to the user, and correcting a color tone in a predetermined order.

However, in any of the above methods, parameters of various processes having different characteristics such as noise removal, color tone correction, sharpness, and the like must be designated one by one in an application order. For example, when correction is to be applied in the order of noise removal, color tone correction, and sharpness, and noise removal parameters are to be changed, one of a method of applying noise removal to an image as a result of application of the three processes, or a method of redoing the above processes from the beginning after undoing all the processes must be selected. As the image process is applied repetitively, an image to be corrected suffers tone jump or the like. Hence, redoing these processes is basically selected. In other words, all the correction results are discarded, and correction processes are redone from the beginning.

Some printer drivers display a thumbnail image that reflects the effect of correction to be applied, or retouch software partially displays an image in an enlarged scale to provide a preview. However, the user cannot observe such image by freely changing the enlargement ratio or display size, and can hardly recognize an actual print result.

SUMMARY OF THE INVENTION

According to the first aspect of the present invention, there is disclosed an image processing apparatus and method, which acquire additional information appended to input image data, set correction parameters for an image process of the input image data using information upon image acquisition, which is indicated by the acquired additional information, and apply a plurality of image processes to the input image data using the correction parameter, wherein the order of the plurality of image processes is determined in advance.

According to this image process, correction can be applied according to additional information appended to image data.

According to the second aspect of the present invention, there is disclosed an image processing apparatus and method, which present correction parameters of a plurality of image processes having different characteristics, and accept a change in correction parameter, and apply the plurality of image processes to an image in a predetermined order.

With this image process, image data can be corrected by processes in an appropriate order.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows a display window of image information;

DETAILED DESCRIPTION OF THE PREFERRED EMBODIMENTS

Figure 1:
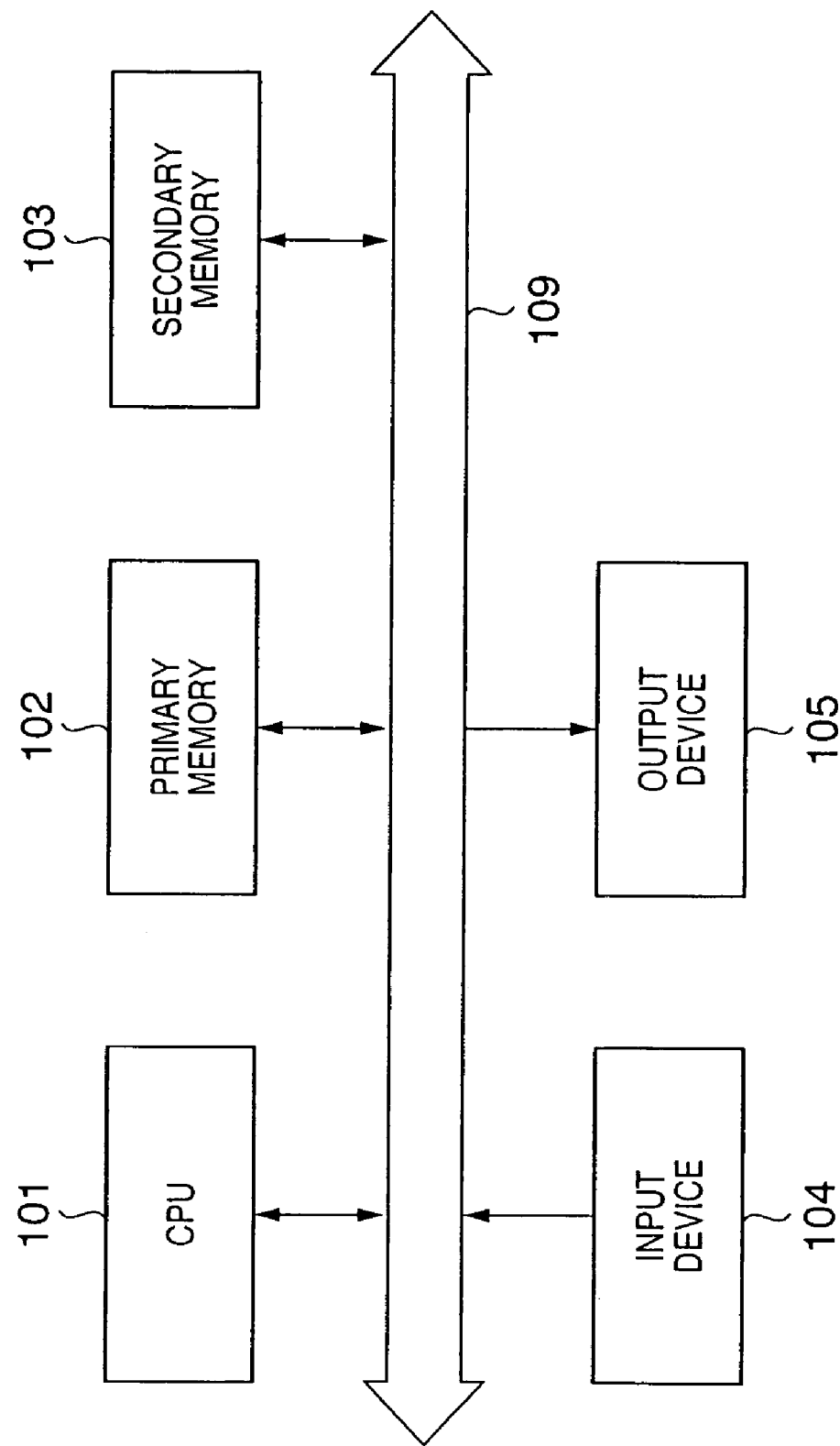
FIG. 1 is a schematic block diagram showing an image processing apparatus according to an embodiment.

An image processing apparatus according to an embodiment of the present invention will be described in detail hereinafter with reference to the accompanying drawings.

[Overview]

If the aforementioned meta data values themselves can be used, more appropriate image correction can be applied. For example, since nearly a pan-focus image is obtained as an f-number is larger, the edge emphasis level may be determined using an arithmetic operation using the f-number itself. When the f-number is small, a filter process that further blurs an out-of-focus portion and further sharpens a focus portion may be applied. When the parameters of this filter are calculated using the f-number itself, a camera setup upon photographing can be directly reflected on the correction result.

In the embodiment to be described below, additional information appended to input image data is acquired, image processing parameters are generated on the basis of information obtained upon image acquisition, which is indicated by the acquired additional information, and the input image data is corrected using the generated image processing parameters.

When an image is to be printed on the basis of corrected image data, image processing parameters are adjusted in accordance with the size and type of a medium used in the print process. More specifically, the image processing parameters are preferably adjusted to emphasize contrast, to enhance sharpness, and/or to enhance noise removal as the medium size increases.

Information upon image acquisition includes the exposure time, the aperture value (f-number), the flash intensity (guide number), the subject distance, the focal length, the ISO speed, and the like.

An image process includes filter processes such as color tone/saturation correction, sharpness correction, noise removal, color cast correction, blur correction, sepia conversion, monotone conversion, solarization, embossing, and the like.

Correction includes a plurality of image processes, the order of which is determined in advance.

In an embodiment to be described below, image processing parameters of a plurality of image processes with different characteristics are presented, a change in image processing parameter is accepted, the plurality of image processes are applied to an image in a predetermined order, and the image that has undergone the plurality of image processes is displayed on a monitor to have an arbitrary size or at an arbitrary magnification.

The plurality of image processes can be automatically executed. In this case, calculation formulas of image processing parameters preferably include unique parameters that reflect user's preferences or information upon image acquisition.

Furthermore, when the image size is larger than a display region, the plurality of image processes are applied to a partial image that can be displayed. Alternatively, when predetermined conditions are met, one or more image processes of the plurality of image processes are preferably skipped. The conditions include a case wherein the image size is larger than the display region, and the magnification is smaller than a predetermined value, and the image display position is being changed, or the magnification is smaller than the predetermined value.

Moreover, the image that has undergone the plurality of image processes is displayed on a monitor to have an arbitrary size or at an arbitrary magnification. The image process and image display are executed every time the image processing parameters are changed.

First Embodiment

Arrangement

FIG. 1 is a schematic block diagram showing an image processing apparatus of this embodiment.

A CPU 101 controls the operation of the overall apparatus, and executes a program and the like stored in a primary memory 102. The primary memory 102 mainly comprises a RAM or the like. The CPU 101 loads a program or the like stored in a secondary memory 103, and stores it on the primary memory 102. The secondary memory 103 corresponds to, e.g., a hard disk or the like. In general, the memory size of the primary memory is smaller than that of the secondary memory 103, and programs, data, and the like which cannot be stored in the primary memory 102 are stored in the secondary memory 103. Also, data and the like, which are to be stored for a long period of time, are stored in the secondary memory 103. That is, the CPU 101 loads a program of, e.g., an image process stored in the secondary memory 103 onto the primary memory 102 upon executing the program.

An input device 104 corresponds to a card reader, a scanner, a film scanner, a digital camera, and the like, which are required to input image data, in addition to a mouse and keyboard, which are used to control the image processing apparatus. An output device 105 corresponds to, e.g., a monitor, printer, and the like. Note that the input device 104 and output device 105 are connected to a system bus 109 via a versatile interface (not shown). As the versatile interface, a serial bus such as USB (Universal Serial Bus), IEE1394, or the like, a parallel interface such as SCSI, GPIB, or the like, a serial interface such as RS232C, RS422, or the like, an infrared/wireless interface such as IrDA, Bluetooth, or the like, and so forth may be used.

The system shown in FIG. 1 may have various other arrangements. However, such arrangements are not the gist of the present invention, and a description thereof will be omitted.

[User Interface]

Figure 2:
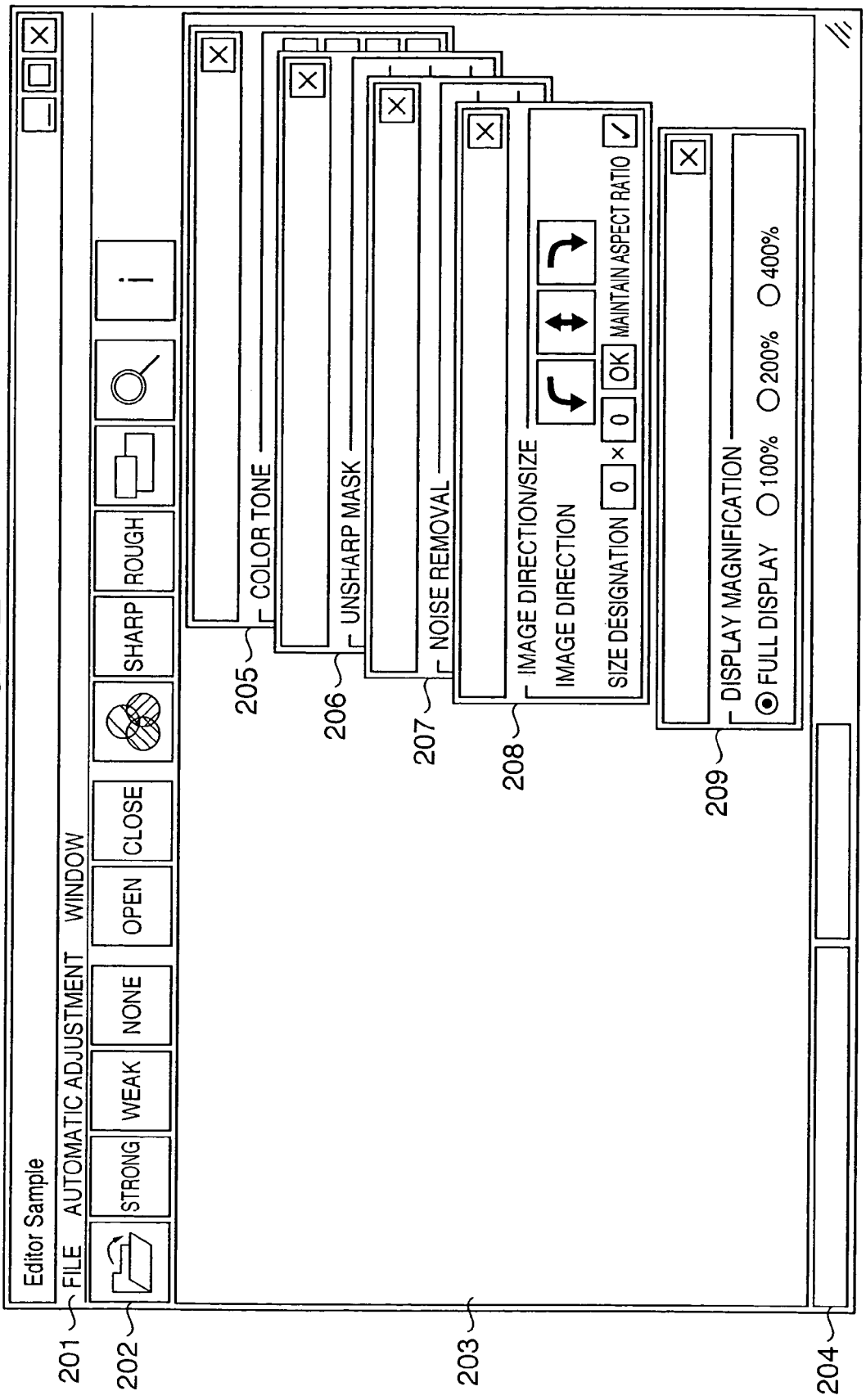
FIG. 2 shows a graphical user interface for image correction, which is displayed on a monitor.

FIG. 2 shows a graphical user interface (GUI) for image correction, which is displayed on a monitor by the CPU 101.

When the user presses a file open button prepared on a tool bar 202 or selects "open" from a file menu of a menu bar 201, a file open dialog is displayed, and an image file can be opened. Of course, the user can open an image file by dragging and dropping an icon of that image file onto a correction image display region 203.

After the image file is selected, the display region 203 displays an image to be corrected. When an image file as a correction result is to be saved, it can be saved in the secondary memory 103 or the like in a versatile image format. The versatile image format includes BMP, JPEG, TIFF, and the like.

A window 209 is a display magnification designation window which allows the user to set the display magnification of the image to be corrected. The window 209 includes radio buttons for setting magnifications such as "full display", "100%", "200%", "400%", and the like. When "full display" is selected, the image to be corrected is displayed to have a size that falls within the display region 203 while maintaining its aspect ratio. On the other hand, an image is displayed at an equal magnification in case of "100%", a 2×-enlarged image is displayed in case of "200%", or a 4×-enlarged image is displayed in case of "400%". The "full display" mode will be simply referred to as full display hereinafter, and other display modes will be referred to as partial display hereinafter.

When the image to be corrected cannot be fully displayed on the display region 203, a scroll bar appears. The user can confirm the entire image by operating the scroll bar. When the user drags the display region 203 clicked by the mouse while the scroll bar is displayed, an image is scrolled by the dragged amount.

A window 208 is an image direction/size designation window which is used to change the image direction and size. The window 208 includes a check box which makes the CPU 101 calculate and input a horizontal or vertical size for the fixed aspect ratio with respect to a vertical (height) or horizontal (width) size input by the user upon changing the image size.

Windows 205 to 207 are respectively a color tone correction window, a USM designation window, and a noise removal designation window, and processing parameters can be set (changed) by operating sliders arranged on these windows. Details of image correction will be described later.

Figure 3:
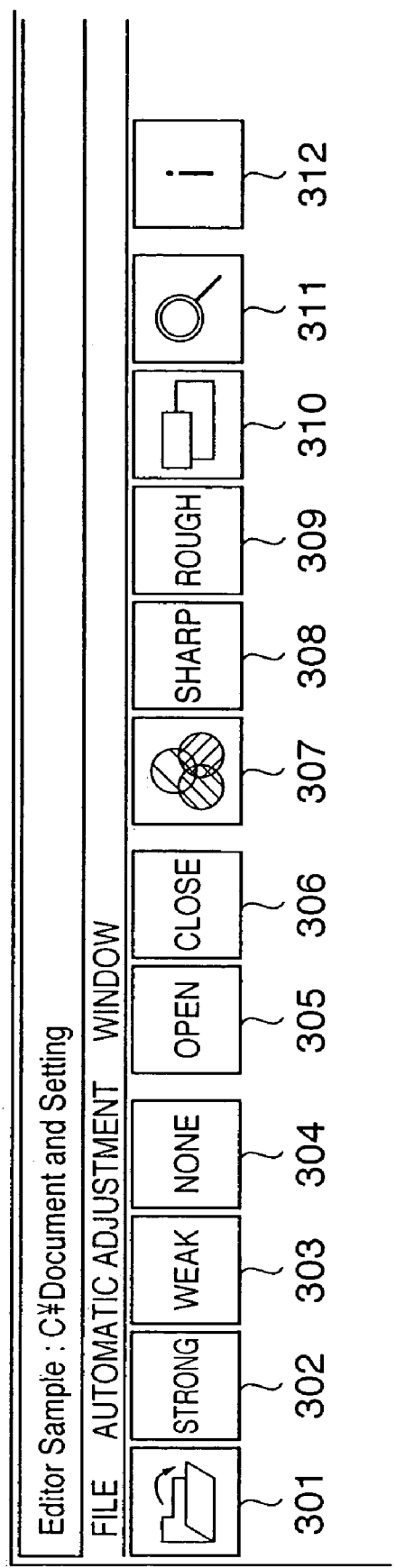
FIG. 3 shows details of a button layout on a tool bar 202.

FIG. 3 shows a detailed button layout example of the tool bar 202.

The tool bar 202 includes a file open button 301 used to open a file, "strong", "weak", and "none" buttons 302 to 304 used to apply automatic correction, an open button 305 used to open all the aforementioned windows 205 to 209, a close button 306 used to close all the windows, buttons 307 to 311 used to open/close respective windows, and an "Info" button 312 used to display image information.

When the "strong" button 302 is pressed, relatively strong automatic correction is applied. When the "weak" button 303 is pressed, relatively weak automatic correction is applied. When the "none" button 304 is pressed, all correction processes are canceled, and an image is reverted to a non-correction state. Automatic correction determines correction parameters using Exif information if data of the image to be corrected is compatible to Exif, in addition to image feature amounts such as a histogram and the like. Note that the correction parameters are those which can be set on the noise removal designation window 207, the color tone correction window 205, and the USM designation window 206. Details of automatic correction will be described later.

Upon depression of the "Info" button 312, image information shown in FIG. 4 is displayed. In a "model" field, Make and Model values stored in 0th IFD of Exif data are displayed. In a "photographing information" field, Capture Scene type, Exposure Time (or Shutter Speed Value), F Number, Exposure Bias Value, Focal Length Value (or Focal Length In 35 mm Film), subject Distance, and Flash values, which are stored in Exif IFD in 0th IFD, are displayed. These values and ISO Speed Ratings value are used in automatic correction to be described later.

The menu bar 201 includes three menu items "file", "automatic correction", and "window".

Figure 5:
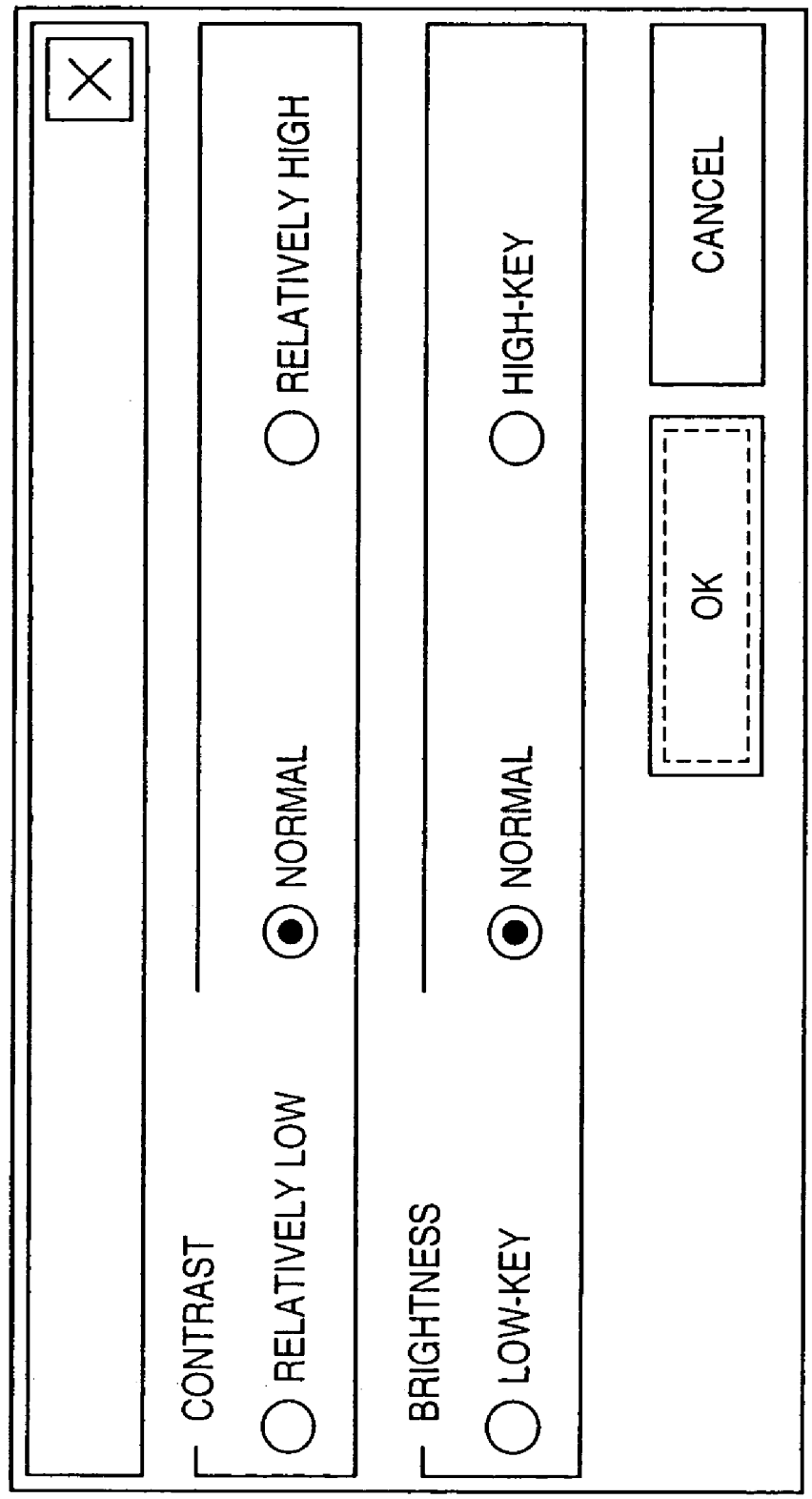
FIG. 5 shows an option window.

The "file" menu includes "open" used to display a file open dialog, "close" used to quit image correction, "print" used to print the image to be corrected, and "option" used to designate user's favor. FIG. 5 shows an example of a window displayed upon selection of "option". In the example of FIG. 5, the user can select "brightness" and "contrast" according to his or her preferences. In addition, user's preferences for other factors, such as sharpness of an image represented by an unsharp mark, and the like may be reflected.

The "automatic correction" menu allows the user to select "relatively strong", "relatively weak", and "none" corresponding to the "strong", "weak", and "none" buttons 302 to 304, although not shown. Upon depression of the "strong" button 302 or upon selection of "relatively strong", such a state will be referred to as "automatic correction/strong" hereinafter. Upon depression of the "weak" button 303 or upon selection of "relatively weak", such state will be referred to as "automatic correction/weak" hereinafter.

The "window" menu allows the user to open the "color tone correction", the "sharpness", the "noise removal", "image size", and the "display magnification" windows corresponding to the buttons 307 to 311.

Figure 6:
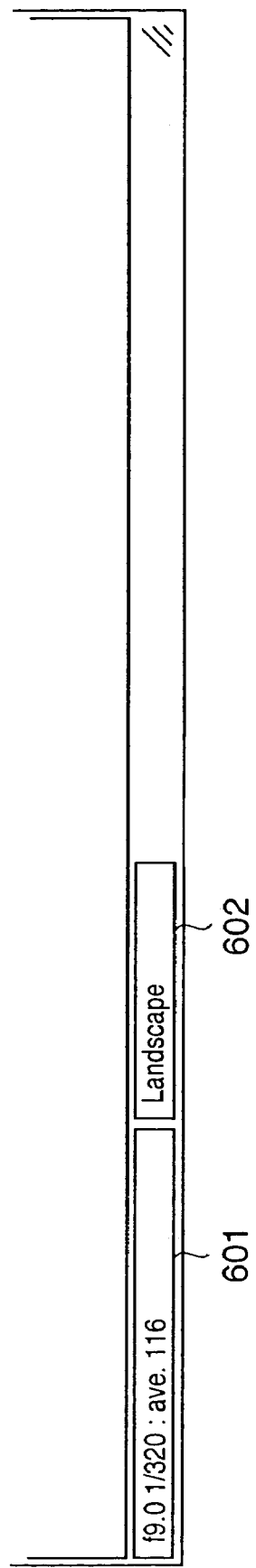
FIG. 6 shows details of a status bar.

FIG. 6 shows details of a status bar 204. The status bar 204 includes a basic information display field 601 and a photographing mode display field 602. The basic information display field 601 displays basic information of an image such as the f-number, the shutter speed, the average luminance, and the like. The photographing mode display field 602 displays a photographing mode upon photographing an image. Note that data extracted from the Exif information are displayed except for the average luminance value.

[Image Correction]

Image correction of this embodiment includes automatic correction and manual correction.

Automatic correction calculates correction parameters on the basis of the analysis result of an image, and corrects the calculated correction parameters if Exif information is available. Note that the analysis result of an image reflects user's preference designated on the "option" window. Additional parameters used to reflect user's preferences will be described later.

Manual correction requires the user to designate correction parameters using the color tone correction window 205, the USM designation window 206, and the noise removal window 207. Of course, the correction parameters set by automatic correction can be corrected using sliders on these windows.

Image correction to be described below is implemented when the CPU 101 executes an application software program stored in the aforementioned secondary memory 103. However, image correction may be implemented by a software process such as a printer driver for the output device 105 or the like.

The additional parameters used to reflect the user's preferences, manual correction, and automatic correction will be described below.

Additional Parameters

The additional parameters used to reflect user's preferences are set on the aforementioned user interface shown in FIG. 5. The additional parameters include two parameters, i.e., a saturation adjustment parameter $S_{user}$ and a contrast adjustment parameter $C_{user}$.

"Brightness" is selected from "low-key", "normal", and "high-key". When "low-key" is selected, the saturation adjustment parameter $S_{user}=-1$; when "normal" is selected, $S_{user}=0$, and when "high-key" is selected, $S_{user}=1$.

"Contrast" is selected from "relatively low", "normal", and "relatively high". When "relatively low" is selected, the contrast adjustment parameter $C_{user}=-1$; when "normal" is selected, $C_{user}=0$; and when "relatively high" is selected, $C_{user}=1$.

These additional parameters are used to determine parameters in automatic correction.

Manual Correction

Figure 7:
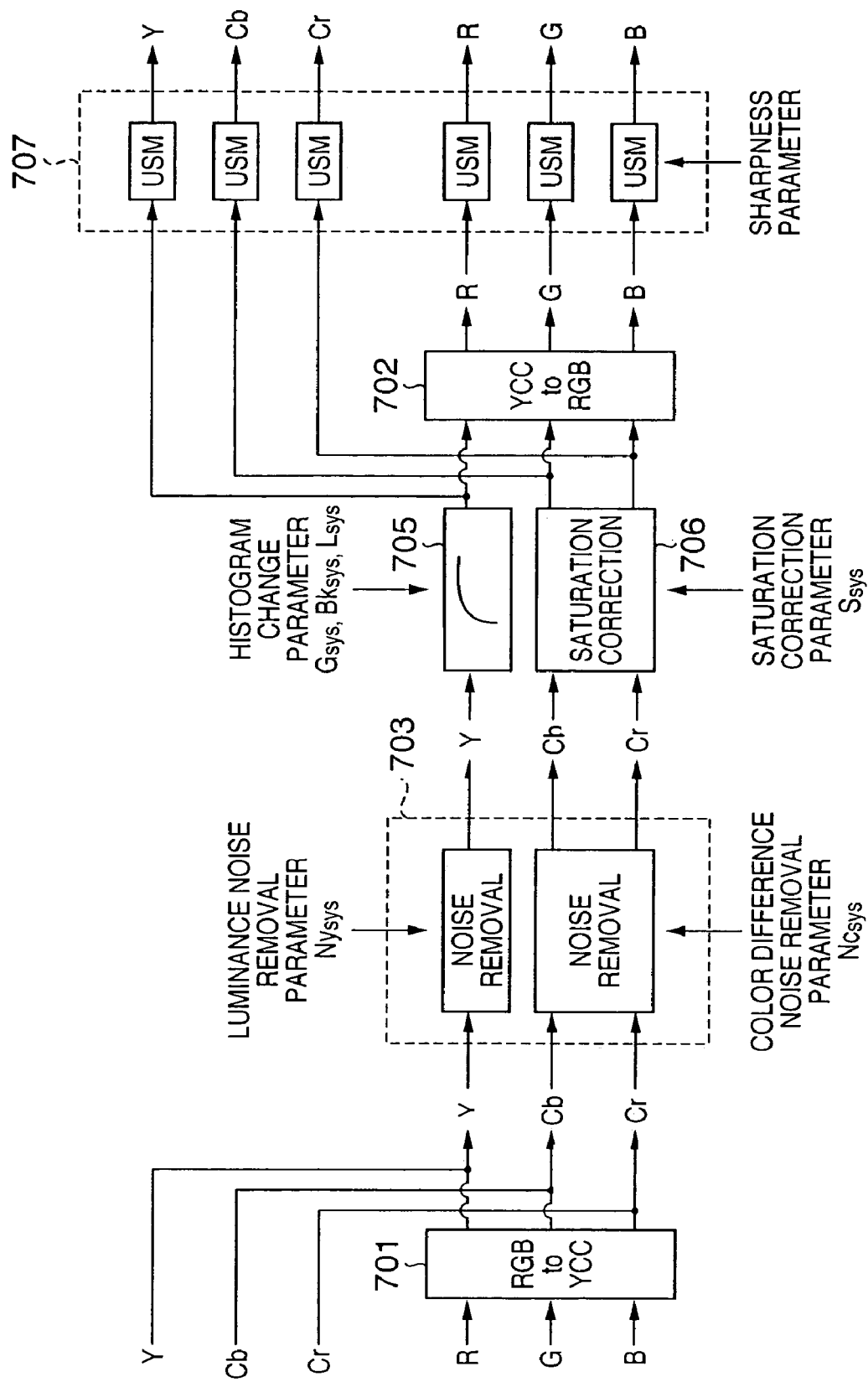
FIG. 7 is a block diagram showing the arrangement of an image process.

FIG. 7 is a block diagram showing the arrangement of the image process. An input signal is a luminance/color difference signal YCbCr or a luminance signal RGB, and an output signal has the same format as the input signal. For example, when a luminance/color difference signal YCbCr is input, a luminance/color difference signal YCbCr is output. When a luminance signal RGB is input, it is converted into a signal YCbCr by a converter 701, and the converted signal undergoes image processes such as a noise removal process 703, a histogram correction process 705, a saturation correction process 706, and the like. After that, the processed signal is re-converted into a signal RGB by a converter 702.

When the correction parameters are changed by operating the image quality adjustment sliders on the windows 205 to 207, noise removal processes 703 for luminance and color difference components, color tone correction process (histogram correction 705 and saturation correction 706), and sharpness (USM) process 707 are applied to image data in a predetermined order, and the application result image is displayed on the display region 203. Note that this embodiment will exemplify noise removal, color tone correction, and sharpness as examples of image processes, but other image processes may be applied.

The order of image processes is preferably determined by a person who is well experienced in correction of images such as photos and the like. In this embodiment, the processes are applied in the order of noise removal, color tone correction, and sharpness as a generally appropriate order. By applying the processes in the predetermined order, even inexperienced and unaccustomed users of the image processes can obtain preferred correction results by executing appropriate image processes.

Noise Removal

The noise removal process 703 of this embodiment includes two noise removal processes for luminance and color difference components.

Figure 8:
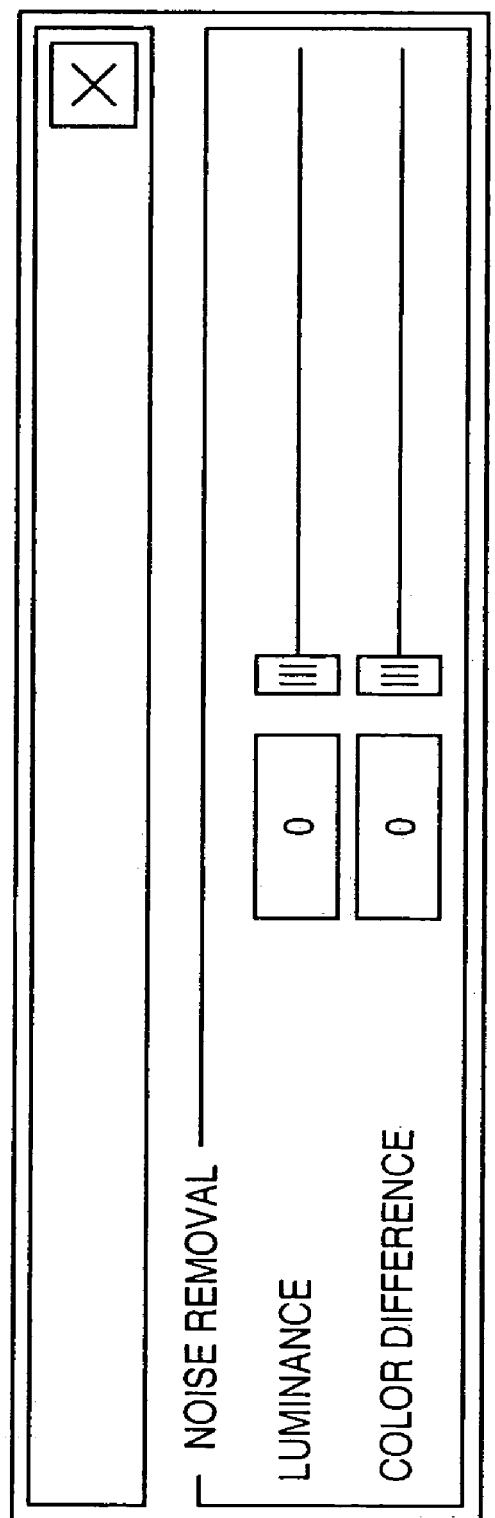
FIG. 8 shows details of a noise removal designation window.

FIG. 8 shows details of the noise removal designation window 207, which includes two sliders "luminance" and "color difference". With these sliders, correction parameters $Ny_{sys}$ and $Nc_{sys}$ are designated. $Ny_{sys}$ is a parameter used to set the noise removal strength for a luminance component, and $Nc_{sys}$ is a parameter used to set the noise removal strength for color difference components. $Ny_{sys}$ and $Nc_{sys}$ assume values ranging from 0 to 100.

As the noise removal process for a luminance component, the following process is applied for the sake of simplicity. That is, luminance $Y_{i,j}$ of a pixel (i,j) is calculated using the luminance values of four neighboring pixels by:

$$Y_{i,j}=(2\times Y_{i,j}+Y_{i-1,j}+Y_{i+1,j}+Y_{i,j-1}+Y_{i,j+1})/6\times(100-Ny_{sys})/100+Ny_{sys}\times Y_{i,j}/100 \quad (1)$$

Likewise, as the noise removal process for color difference components, the following process is applied for the sake of simplicity. That is, color differences $Cb_{i,j}$ and $Cr_{i,j}$ of a pixel (i,j) are calculated using color difference values of four neighboring pixels by:

$$Cb_{i,j}=(2\times Cb_{i,j}+Cb_{i-1,j}+Cb_{i+1,j}+Cb_{i,j-1}+Cb_{i,j+1})/6\times(100-Nc_{sys})/100+Nc_{sys}\times Cb_{i,j}/100 \quad (2)$$

$$Cr_{i,j}=(2\times Cr_{i,j}+Cr_{i-1,j}+Cb_{i+1,j}+Cb_{i,j-1}+Cb_{i,j+1})/6\times(100-Nc_{sys})/100+Nc_{sys}\times Cr_{i,j}/100 \quad (3)$$

Color Tone Correction

Parameters used in color tone correction include three parameters, i.e., gamma $G_{sys}$, black level $Bk_{sys}$, and lightness $L_{sys}$ for luminance, and one parameter, i.e., saturation $S_{sys}$ for color differences. Note that the three parameters $G_{sys}$, $Bk_{sys}$, and $L_{sys}$ will be referred to as histogram change parameters hereinafter.

Figure 9:
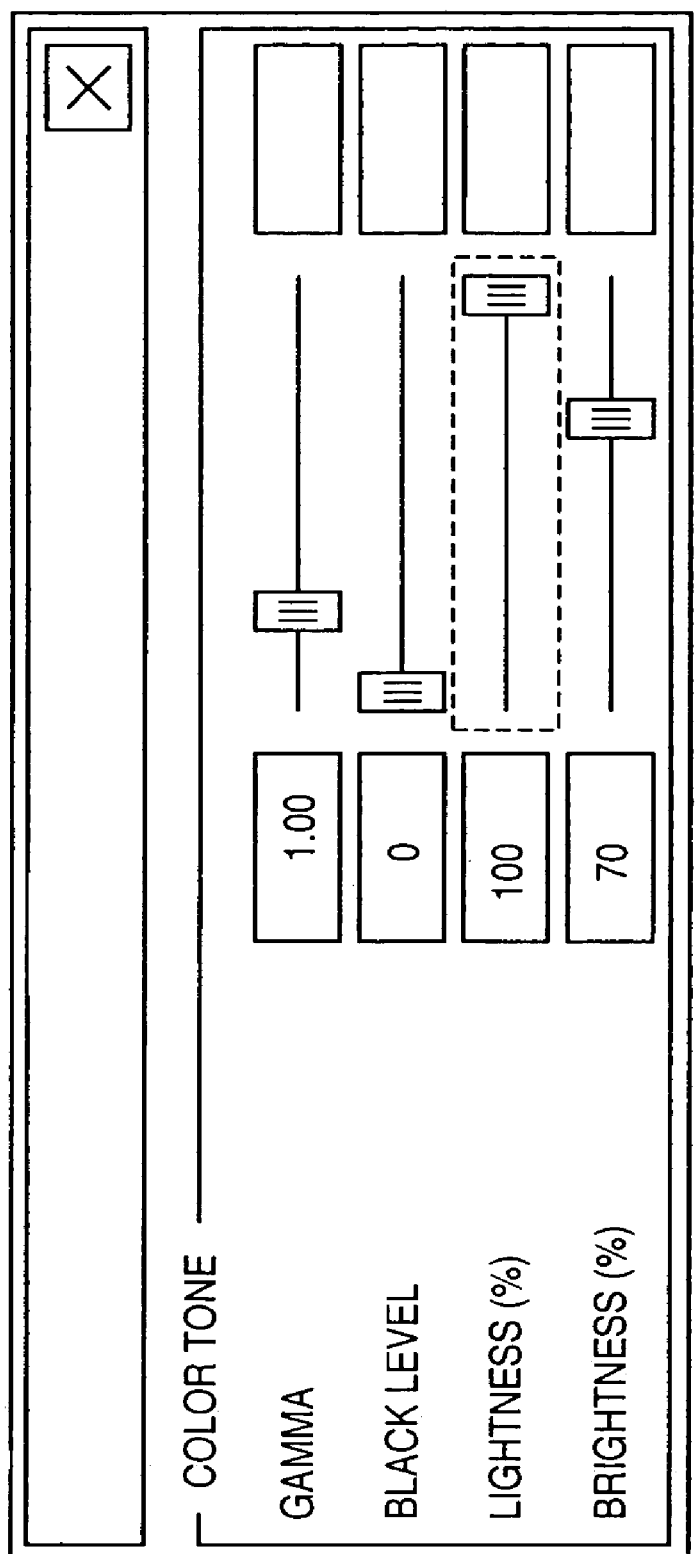
FIG. 9 shows details of a color tone correction window.

FIG. 9 shows details of the color tone correction window 205. $G_{sys}$, $Bk_{sys}$, $L_{sys}$, and $S_{sys}$ can be changed by sliders on the color tone correction window 205. In this embodiment, $G_{sys}$ assumes a value ranging from 0.1 to 6.0, $Bk_{sys}$ assumes a value ranging from 0 to 255, $L_{sys}$ assumes a value ranging from −100 to 100, and $S_{sys}$ assumes a value ranging from 0 to 150.

Figure 10:
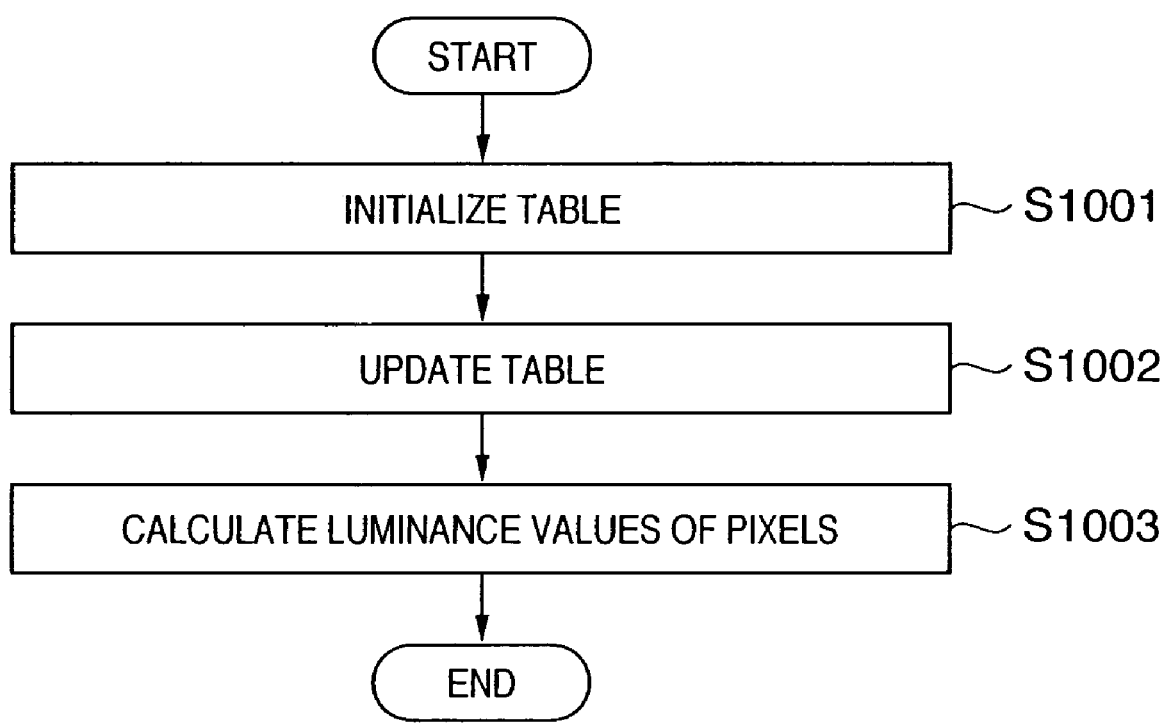
FIG. 10 is a flowchart showing a luminance correction sequence.

FIG. 10 shows a luminance correction sequence. A table hist[256] to calculate luminance values of pixels is initialized to hist[i]=i(S1001), and the table hist[i] is updated (S1002), e.g., by:

$$hist[i]=255\times[\{v/(255-Bk)\}^{1/G_{sys}}]+L_{sys}\times(255-v)/255 \quad (4)$$

for v=0(1<Bk)

$v=1-Bk$ (0≦Bk≦1)

Luminance values j of respective pixels are calculated by using the table hist[i] as j=hist[i] (S1003). Note that the luminance values are reflected upon generating an image to be displayed on an uppermost layer "display" in FIG. 12 or 13 (to be described later).

Note that various calculation formulas of the table hist[i] are available, and formulas used to calculate the table are not particularly limited. However, using equation (4), a highlight part can be prevented from being cut, and a considerable image quality drop due to highlight saturation as a result of color tone correction can be eliminated.

On the other hand, saturation correction corrects color difference values of each pixel to those given by:

$$u'=S_{sys}/100\times u \quad (5)$$

where u is a color difference vector (Cb, Cr) before correction, and u' is a color difference vector (Cb', Cr') after correction.

Sharpness

Figure 11:
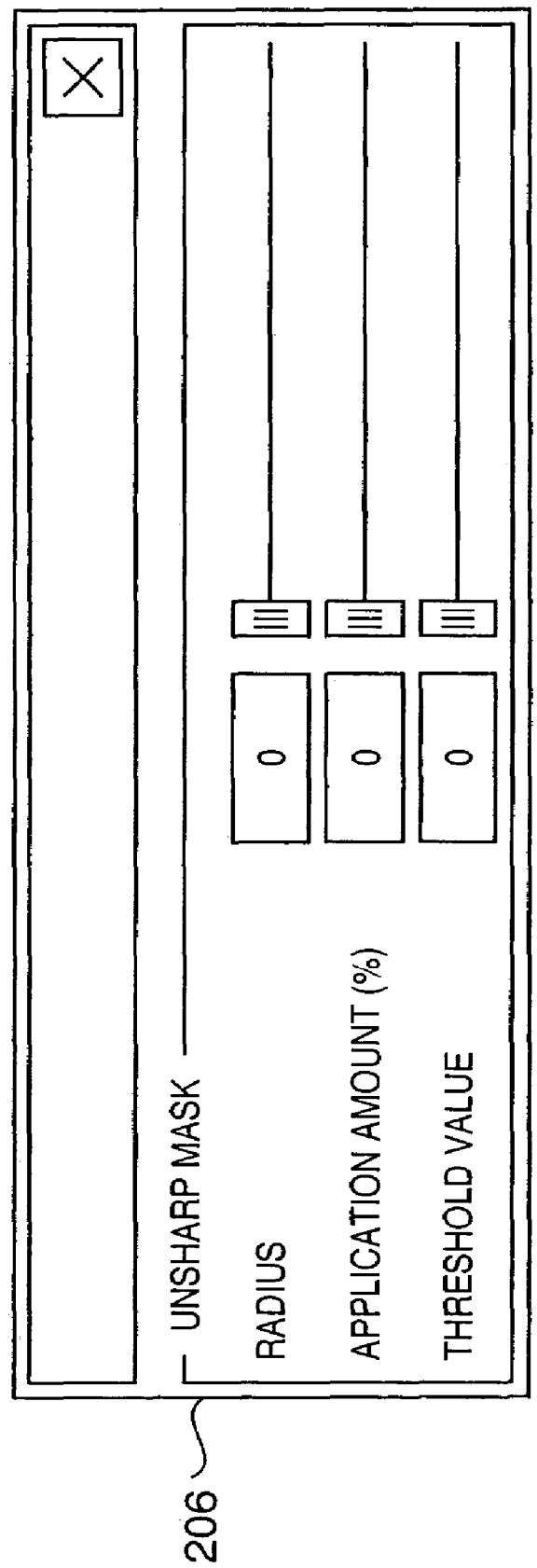
FIG. 11 shows details of a USM designation window.

The sharpness process applies a process called an unsharp mask (USM). A detailed description of the USM will be omitted. The USM includes three parameters, i.e., application radius $R_{sys}$, application amount $V_{sys}$, and threshold value $Th_{sys}$, and the USM designation window 206 includes sliders used to adjust these three parameters. FIG. 11 shows details of the USM designation window 206.

Automatic Correction

Automatic image correction in this embodiment automatically sets correction parameters using image feature amounts such as a histogram and the like and photographing conditions such as Exif information and the like. In Exif information, "standard", "landscape", "portrait", and "nightscape" are prepared as photographing modes. This information holds a camera mode set by the user upon photographing, and is effective to set the correction parameters more satisfactorily.

Since the correction parameters are calculated by formulas that adopt photographing conditions such as the exposure time, the f-number, and the like, correction that can nearly fully reflect user's intention can be applied. For example, nearly a pan-focus image is obtained as the f-number is larger. In such case, the sharpness process may be relatively strongly applied. Using a guide number indicating the flash emission amount, an ISO speed indicating exposure sensitivity, a subject distance as a distance to a subject, an f-number upon photographing, and a focal length converted to that of a 35-mm film upon photographing, whether or not flash light has reached a subject, and a condition required for flash light to reach a subject can be calculated. For example, in case of ISO100, the relationship among a guide number Gn, subject distance D, and f-number f is given by:

$$Gn=D\times f \quad (6)$$

Therefore, when a small guide number is selected compared to the subject distance, lightness may be corrected to an appropriate value using the f-number upon photographing and an ideal f-number.

The automatic setting method of the correction parameters will be described below.

Noise Removal and Noise Correction Parameters $Ny_{sys}$ and $Nc_{sys}$

The noise removal parameter $Ny_{sys}$ for a luminance component assumes a value obtained by calculating the average value of luminance differences of neighboring pixels for the entire image, dividing that average value $YD_{AVE}$ by a maximum value $YD_{MAX}$ of the luminance differences, and multiplying the quotient by 100.

The noise correction parameter $Nc_{sys}$ for color difference components assumes a value obtained by calculating the difference vectors of color difference vectors of neighboring pixels, calculating the average values of norms of the difference vectors for the entire image, dividing that average value $CD_{AVE}$ by a maximum value $CD_{MAX}$ of the difference vectors, and multiplying the quotient by 100.

However, the above processes require much time. Hence, this embodiment calculates $Ny_{sys}$ and $Nc_{sys}$ using an exposure time TE (sec) by:

When TE>1 or in case of photographing mode "nightscape", $$Ny_{sys}=TE\times 2$$

In other cases, $$Ny_{sys}=0$$

$$Nc_{sys}=0 \quad (7)$$

Gamma Correction Parameter $G_{sys}$

Of the color tone correction parameters, the gamma correction parameter $G_{sys}$ is calculated using the exposure time TE (sec) by:

(Automatic Correction/Strong)
When TE<30, $$G_{sys}=1.4-TE/75$$

When TE>30, $$G_{sys}=1.0 \quad (8)$$

(Automatic Correction/Weak)
When TE<30, $$G_{sys}=1.2-TE/150$$

When TE>30, $$G_{sys}=1.0 \quad (9)$$

Black Level Correction Parameter $Bk_{sys}$

Of the color tone correction parameters, the black level correction parameter $Bk_{sys}$ is calculated using the exposure time TE (sec) by:

When TE<0.03 or in case of photographing mode "landscape", $$Bk_{sys}=C_{user}\times++\beta+\sqrt{f}$$

When $0.03 \leq TE<1$ or in case of photographing mode other than "landscape" and "nightscape", $$Bk_{sys}=C_{user}\times++\beta$$

When $TE \geq 1$ or in case of photographing mode "nightscape", $$Bk_{sys}=C_{user}\times\alpha \quad (10)$$

where f is the f-number obtained from the photographing information. However, if no photographing information is available (for example, image data to be corrected is incompatible to Exif), this term is ignored. α and β are respectively given by:

(Automatic correction/strong)

$$\alpha=3$$

When $hist(Bk_{HIGH})<Bk_{ValueHIGH}$, $$\beta=hist(Bk_{HIGH})$$

Otherwise, $$\beta=hist(Bk_{ValueHIGH})$$

(Automatic Correction/Weak)

$$\alpha=2$$

When $hist(Bk_{LOW})<Bk_{ValueLOW}$, $$\beta=hist(Bk_{LOW})$$

Otherwise, $$\beta=hist(Bk_{ValueLOW}) \quad (11)$$

where $hist(Bk_{HIGH})$ and $hist(Bk_{LOW})$ are the luminance values of the lightest and darkest pixels of those which are selected at a predetermined ratio (n %) in ascending order of luminance. For example, $Bk_{HIGH}=13$, $Bk_{LOW}=4$, and the like. $Bk_{ValueHIGH}$ and $Bk_{ValueLow}$ are constants that suppress excessive black level correction, and $Bk_{ValueHIGH}=40$ and $Bk_{ValueLOW}=20$ in this embodiment.

Lightness Correction Parameter $L_{sys}$

Of the color tone correction parameters, the lightness correction parameter $L_{sys}$ is calculated using an average luminance value $L_{ave}$ of the entire image by:

When $L_{ave}-128>L_{limit}$, $$L_{sys}=P_{mode}\times a+L_{limit}$$

When $|L_{ave}-128|<L_{limit}$, $$L_{sys}=P_{mode}\times a+128-L_{ave}$$

When $128-L_{ave}>L_{limit}$, $$L_{sys}=P_{mode}\times a-L_{limit} \quad (12)$$

where $L_{limit}$ is a constant that prevents application of excessive lightness correction. The variable $P_{mode}$ represents whether or not the photographing mode is "portrait". If the photographing mode is the "portrait" mode, $P_{mode}=1$; otherwise, $P_{mode}=0$. In case of automatic correction/strong, $L_{limit}=16$ and a=3; in case of automatic correction/weak, $L_{limit}=8$ and a=2. However, when the exposure time is 1 sec or more, or when the photographing mode is "nightscape", $L_{sys}=0$ irrespective of the value of $L_{ave}$.

Normally, photographing of a person prefers slight overexposure. Using equations (12), appropriate correction can be applied without any complicated processes such as face detection or the like.

Sharpness Correction Parameter $V_{sys}$

The sharpness correction parameters include three parameters, i.e., the application radius $R_{sys}$, application amount $V_{sys}$, and threshold value $Th_{sys}$, as described above. However, in automatic correction of this embodiment, the application amount $V_{sys}$ alone is automatically set by:

When TE>1 or in case of photographing mode "nightscape", $$V_{sys}=USM_{MAXValue}-TE$$

Otherwise, $$V_{sys} = USM_{MAXValue} \quad (13)$$

The application radius $R_{sys}=1$, and threshold value $Th_{sys}=0$. where $USM_{MAXvalue}$ is the maximum application amount of the USM: $USM_{MAXValue}=80$ in case of automatic correction/strong, $USM_{MAXValue}=50$ in case of automatic correction/weak. When $V_{sys}$ assumes a negative value, $V_{sys}=0$.

In this way, appropriate image correction can be applied using the Exif information.

Second Embodiment

In the first embodiment, the entire image is simply corrected, and the corrected image is presented to the user. However, an image process of the entire image often requires much time, and it is practical to apply an image process to only a portion displayed on the screen. The second embodiment will exemplify a case wherein only a portion to be displayed on the screen undergoes an image process, and the corrected portion is presented to the user.

Figure 12:
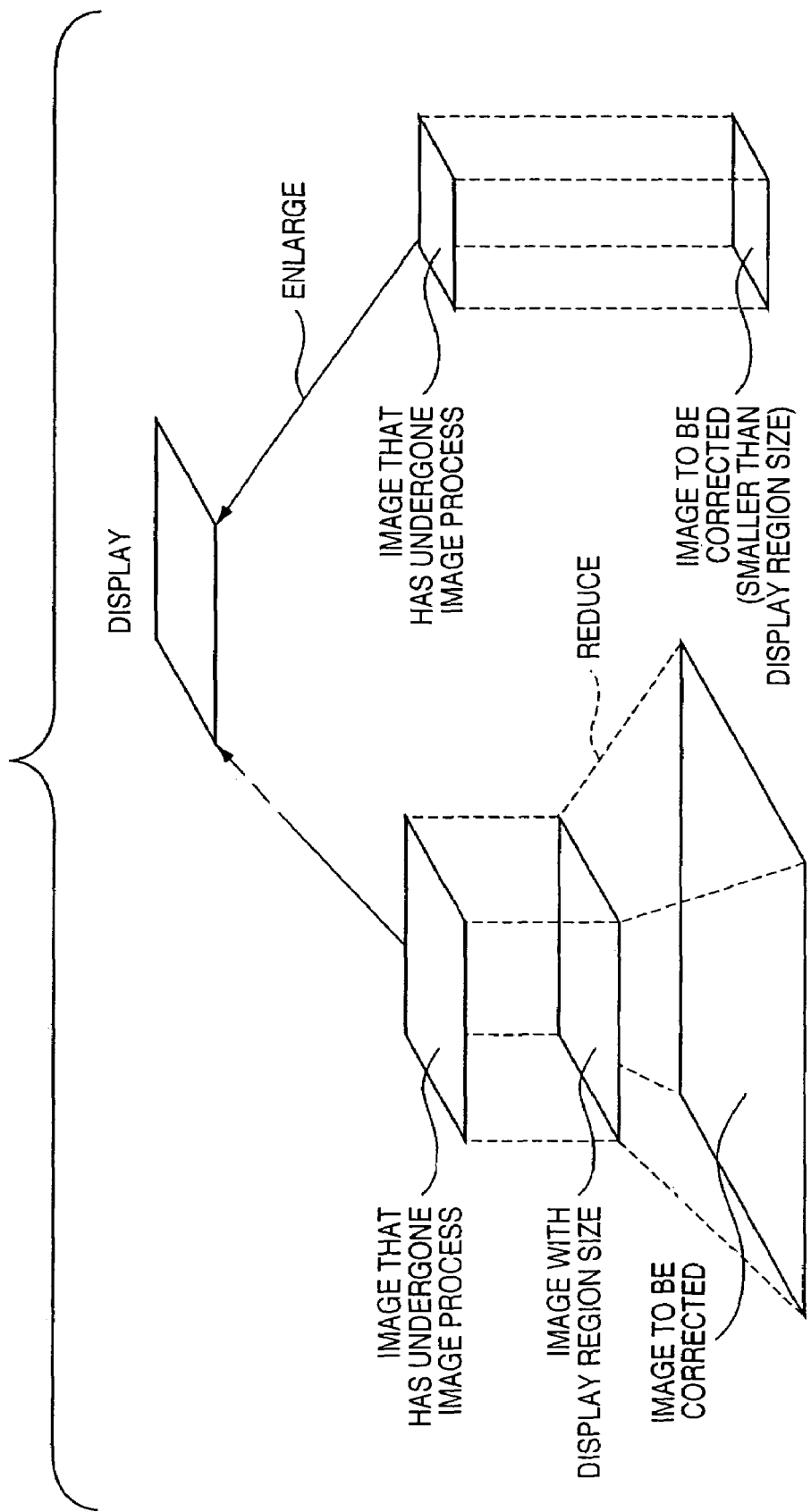
FIG. 12 is a view for explaining a process upon displaying a full image.

FIG. 12 is a view for explaining the process upon displaying a full image. When the size of an image to be corrected is larger than the display region 203, the image to be corrected is reduced to a size that is inscribed in the display region 203, and all correction processes are applied. Conversely, if the size of the image to be corrected is smaller than the display region 203, all correction processes are applied, and the processed image then undergoes an enlargement process immediately before it is displayed. Various methods can be applied as an enlargement/reduction algorithm, but a detailed description thereof will be omitted.

Figure 13:
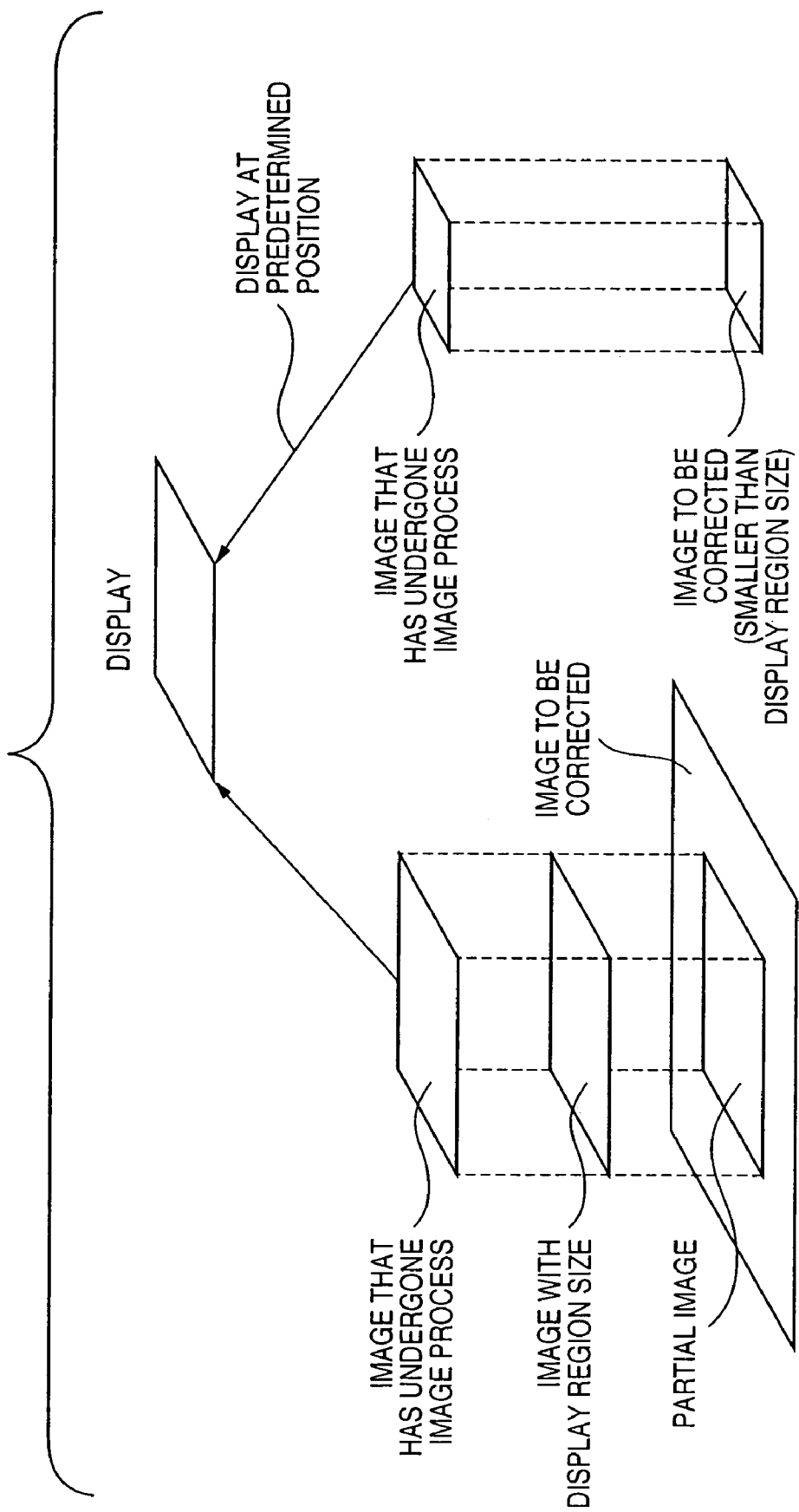
FIG. 13 is a view for explaining a process upon displaying a partial image.

FIG. 13 is a view for explaining the process upon displaying a partial image. When the size of an image to be corrected is larger than the display region 203, a partial image with a size that is inscribed in the display region 203 is extracted from the image to be corrected, all correction processes are applied to the partial image, and the processed image is displayed on the display region 203. Conversely, if the size of the image to be corrected is smaller than the display region 203, all correction processes are applied, and the processed image is then displayed at a predetermined position (e.g., the center) of the display region 203.

With this process, the correction result can be presented to the user more smoothly. In the system in which the correction processes are applied after the reduction process, as shown in FIG. 12, some of correction processes produce different results when the correction processes are applied to the image to be corrected itself and when they are applied to a reduced image. For example, in the USM used in the sharpness process, if a radius used in the process is designated using pixels, it is virtually enlarged after the reduction process. In such case, the application radius of the USM may be reduced in correspondence with the reduction ratio. For example, an application radius R ys of the USM is calculated using the correction parameter $R_{sys}$ by:

$$R_{sys}' = R_{sys} \times Dux \quad (14)$$

for $Dux = Width_{view}/Width_{orig}$ where $Width_{orig}$ is the width (pixels) of an image, and $Width_{view}$ is the width (pixels) of an enlarged or reduced image.

Third Embodiment

The second embodiment has explained the method of speeding up the processes described in the first embodiment. The third embodiment will explain a method of further speeding up the processes.

For example, if the size of an image to be corrected is larger than the display region 203 upon displaying a partial image, when a partial image to be displayed on the display region 203 is changed, the second embodiment always extracts a partial image, applies all image processes to that image, and displays the application result. When image correction is implemented by hardware, it is more likely that a sufficiently high processing speed can be assured by the processes of the second embodiment. However, when image correction is implemented by software, the scroll speed may lower or a smooth scroll operation may be disturbed.

To solve such problem, some image correction processes (e.g., noise removal and sharpness) may be skipped during a size change process of an image to be corrected upon displaying a full image and during a change process of the display region by the scroll operation upon displaying a partial image.

Figure 14:
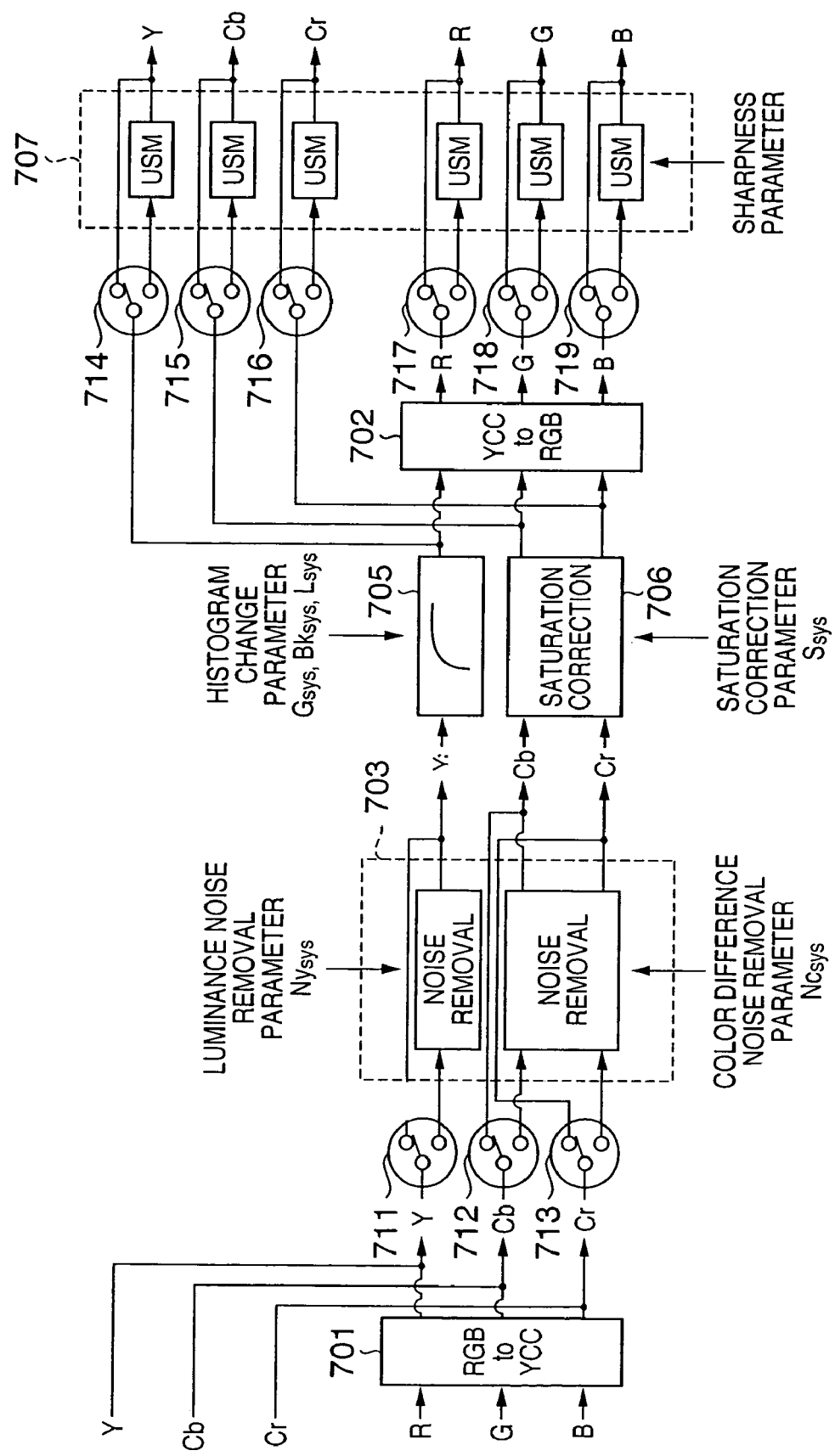
FIG. 14 is a block diagram showing the arrangement of an image process that can skip noise removal and sharpness processes.

FIG. 14 is a block diagram showing the arrangement of the image process that can skip the noise removal and sharpness processes. Switches SW 711 to 719 are turned on when one of the following skip conditions is met, thus skipping the noise removal and sharpness processes:

(1) during the resizing operation of a window including the display region 203; and (2) during the scroll operation upon displaying a partial image: i.e., when the mouse is dragged while the mouse button is held down on the display region 203, or during the operation of the scroll bar.

Figure 15:
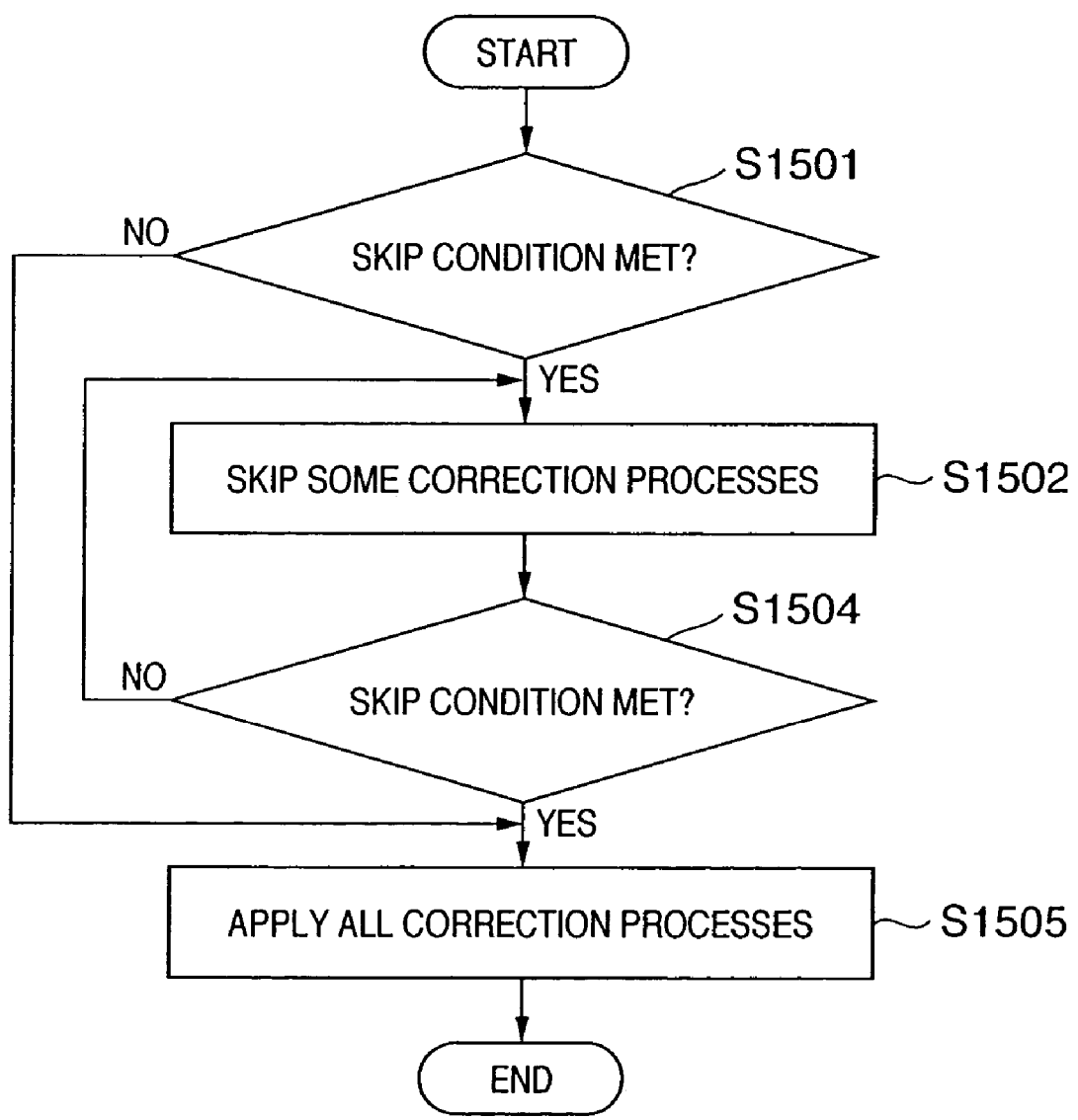
FIG. 15 is a flowchart showing a skip process.

In an event-driven system, upon reception of an event corresponding to condition (2), the switches SW 711 to 719 are turned on to skip some of the correction processes. Otherwise, the CPU 101 may execute a skip process shown in FIG. 15 in response to a mouse operation.

It is checked if one of the skip conditions is met (S1501). If one of the skip conditions is met, the switches SW 711 to 719 shown in FIG. 14 are turned on to skip some correction processes (S1502). The skip conditions are checked again (S1504). If one of the skip conditions is met, the flow returns to step S1502 to repeat steps S1502 and S1504.

If none of the skip conditions are met in step S1501 or S1504, all the correction processes are applied (S1505), thus ending the process.

Since the need for presenting the correction result to the user is low during the scroll or resizing operation, some correction processes are skipped, thus providing a more pleasant GUI operation to the user.

Fourth Embodiment

The fourth embodiment will explain a process for printing an image corrected using the aforementioned GUI.

A print process generates a print image by enlarging or reducing an image signal obtained by applying image correction by a system shown in FIG. 7 to an image size corresponding to print data determined by the print resolution, and converts the print image into a print image signal (e.g., signal CMYK or the like) independently of the embodiments used to implement the image processing unit. In this case, identical correction parameters may be applied irrespective of a print size. However, the correction parameters may be corrected in correspondence with the printout size. In general, when an image is printed on a small print sheet (e.g., 3"×5" size), contrast tends to look high even when identical data is printed, compared to a case wherein that image is printed on a large print sheet (e.g., A4 size). Hence, the correction parameters may be corrected according to the area of a print sheet.

In the fourth embodiment, contrast is corrected using an area ratio α when the area of the 3"×5" size is 1. More specifically, contrast is adjusted by correcting the black level $Bk_{sys}$ of the histogram change parameters. Of the correction parameters of the sharpness process, the USM application amount $V_{sys}$ is corrected. A black level $Bk_{prt}$ and application amount $V_{prt}$ upon printing are respectively given by:

$$Bk_{prt} = +\times Bk_{sys} \qquad (15)$$

$$V_{prt} = (100+\alpha) \times V_{sys}/100 \qquad (16)$$

For example, in case of an A4-size print sheet, since α>1, contrast is emphasized to assure strong sharpness.

When the correction parameters are corrected in this way, impression differences depending on the printout size can be reduced.

Also, it is effective to correct the correction parameters in accordance with the type of print sheet used in a print process or to correct the correction parameters to enhance noise removal as a print sheet has a larger size. That is, as a print sheet reflects light strongly or is white, contrast looks high. Hence, $Bk_{sys}$ for such print sheet is reduced to weaken contrast. When an image enlarged from an original image is printed to a print sheet with a large size, a noise image is enlarged compared to the original printing of the image to a print sheet with a small size. Hence, noise removal is preferably strengthened in accordance with the size of the print sheet.

As described above, according to the aforementioned embodiments, image correction that appropriately reflects a camera setup upon photographing can be applied using numerical values themselves of photographing information stored as meta data.

The image correction result is presented to the user in real time, and appropriate image correction can be applied regardless of the order of processes. Arbitrary parameters can be adjusted to obtain an automatic correction result that reflects user's favor.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising steps of:
   acquiring additional information appended to input image data:
      setting a correction parameter for an image process of the input image data using information obtained upon image acquisition, which is indicated by the acquired additional information;
      applying a plurality of image processes to the input image data using the correction parameter to produce corrected image data, wherein an order of the plurality of image processes is determined in advance;
      outputting the corrected image data to an image forming device; and
      adjusting the correction parameter in accordance with the size and/or the type of a medium used in a print process,
      wherein the correction parameter is adjusted to emphasize contrast when the size of the medium is increased.

2. The method according to claim 1, wherein the information upon image acquisition includes at least one of an exposure time, an aperture value, flash intensity, a subject distance, a focal length, and an ISO speed upon photographing an image.

3. The method according to claim 1, wherein the plurality of image processes include at least two of color tone/saturation correction, sharpness correction, noise removal, color cast correction, blur correction, sepia conversion, monotone conversion, solarization, and embossing.

4. An image processing method comprising steps of:
acquiring additional information appended to input image data;
setting a correction parameter for an image process of the input image data using information obtained upon image acquisition, which is indicated by the acquired additional information;
applying a plurality of image processes to the input image data using the correction parameter to produce corrected image data, wherein an order of the plurality of image processes is determined in advance;
outputting the corrected image data to an image forming device; and
adjusting the correction parameter in accordance with the size and/or the type of a medium used in a print process,
wherein the correction parameter is adjusted to strengthen sharpness when the size of the medium is increased.

5. An image processing method comprising steps of:
acquiring additional information appended to input image data;
setting a correction parameter for an image process of the input image data using information obtained upon image acquisition, which is indicated by the acquired additional information;
applying a plurality of image processes to the input image data using the correction parameter to produce corrected image data, wherein an order of the plurality of image processes is determined in advance;
outputting the corrected image data to an image forming device; and
adjusting the correction parameter in accordance with the size and/or the type of a medium used in a print process,
wherein the correction parameter is adjusted to enhance noise removal when the size of the medium is increased.

6. A computer-readable storage medium storing a computer-executable program for causing a computer to perform an image processing method, the method comprising steps of:
acquiring additional information appended to input image data;
setting a correction parameter for an image process of the input image data using information obtained upon image acquisition, which is indicated by the acquired additional information;
applying an image process to the input image data using the correction parameter to produce corrected image data, wherein the image process includes a plurality of image processes, an order of which is determined in advance;
outputting the corrected image data to an image forming device; and
adjusting the correction parameter in accordance with the size and/or the type of a medium used in a print process, wherein the correction parameter is adjusted to emphasize contrast when the size of the medium is increased.

7. A computer-readable storage medium storing a computer-executable program for causing a computer to perform an image processing method, the method comprising steps of:
acquiring additional information appended to input image data;
setting a correction parameter for an image process of the input image data using information obtained upon image acquisition, which is indicated by the acquired additional information;
applying an image process to the input image data using the correction parameter to produce corrected image data, wherein the image process includes a plurality of image processes, an order of which is determined in advance; and
outputting the corrected image data to an image forming device,
wherein the applying step omits sharpness correction and noise removal from the plurality of image processes when an image represented by the input image data is scrolled.

8. A method of performing image processing by software, comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
adjusting the correction parameters in accordance with the size and/or the type of a medium used in a print process,
wherein the correction parameters are adjusted to emphasize contrast when the size of the medium is increased.

9. The method according to claim 8, further comprising a step of automatically executing the plurality of image processes.

10. The method according to claim 9, wherein the automatic execution step comprises a step of including a parameter used to reflect a user's preference in calculation formulas of the correction parameters.

11. The method according to claim 9, wherein the automatic execution step comprises a step of including the information obtained upon image acquisition in calculation formulas of the correction parameters.

12. The method according to claim 8, wherein the plurality of image processes include at least two of color tone/saturation correction, sharpness correction, noise removal, color cast correction, blur correction, sepia conversion, monotone conversion, solarization, and embossing.

13. The method according to claim 8, further comprising a step of applying, when the size of the image is larger than a display region, the plurality of image processes to a displayable partial image.

14. A method of performing image processing by software, comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image:
outputting the processed image to an image forming device; and
adjusting the correction parameters in accordance with the size and/or the type of a medium used in a print process, wherein the correction parameters are adjusted to strengthen sharpness when the size of the medium is increased.

15. A method of performing image processing by software, comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
adjusting the correction parameters in accordance with the size and/or the type of a medium used in a print process, wherein the correction parameters are adjusted to enhance noise removal when the size of the medium is increased.

16. A method of performing image processing by software, comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
skipping, when a predetermined condition is met, at least one image process of the plurality of image processes,
wherein the condition is met when the size of the image is larger than a display region, and the magnification of the image is smaller than a predetermined value.

17. The method according to claim 16, further comprising a step of displaying an image that has undergone the plurality of image processes on a monitor to have an arbitrary size and at an arbitrary magnification.

18. The method according to claim 17, further comprising a step of executing the plurality of image processes and the image display process every time the correction parameter is changed.

19. A method of performing image processing by software, comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
skipping, when a predetermined condition is met, at least one image process of the plurality of image processes,
wherein the condition is met when the size of the image is larger than a display region, and a change process of a display position of the image is in progress.

20. A method of performing image processing by software, comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
skipping, when a predetermined condition is met, at least one image process of the plurality of image processes,
wherein the condition is met when a magnification of the image is smaller than a predetermined value.

21. A computer-readable storage medium storing a computer-executable program for causing a computer to perform an image processing method, the method comprising steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
adjusting the correction parameters in accordance with the size and/or the type of a medium used in a print process,
wherein the correction parameters are adjusted to emphasize contrast when the size of the medium is increased.

22. A computer-readable storage medium storing a computer-executable program for causing a computer to perform an image processing method, the method comprising the steps of:
presenting correction parameters of a plurality of image processes having different characteristics;
accepting a change in one of the correction parameters;
applying the plurality of image processes to an image in a predetermined order using the accepted, changed correction parameter to produce a processed image;
outputting the processed image to an image forming device; and
skipping, when a predetermined condition is met, at least one image process of the plurality of image processes,
wherein the condition is met when the size of the image is larger than a display region, and the magnification of the image is smaller than a predetermined value.

23. An image processing method comprising the steps of:
acquiring additional information appended to input image data;
setting a correction parameter for an image process of the input image data using information obtained upon image acquisition, which is indicated by the acquired additional information;
applying a plurality of image processes to the input image data using the correction parameter to produce corrected image data, wherein an order of the plurality of image processes is determined in advance; and
outputting the corrected image data to an image forming device,
wherein the applying step omits sharpness correction and noise removal from the plurality of image processes when an image represented by the input image data is scrolled.

24. An image processing apparatus comprising:
an obtaining section, arranged to acquire additional information appended to input image data;
a setting section, arranged to set a correction parameter for an image process of the input image data using information obtained upon image acquisition, which is indicated by the acquired additional information;
a processor, arranged to apply a plurality of image processes to the input image data using the correction parameter to produce corrected image data, wherein an order of the plurality of image processes is determined in advance; and
an outputting section, arranged to output the corrected image data to an image forming device, wherein the processor omits sharpness correction and noise removal from the plurality of image processes when an image represented by the input image data is scrolled.

25. A method of performing image processing by software, comprising the steps of:
    presenting correction parameters of a plurality of image processes having different characteristics;
    accepting a change in one of the correction parameters;
    applying the plurality of image processes to an image in a predetermined order using the accepted, changed correction parameter to produce a processed image; and
    outputting the processed image to an image forming device,
    wherein the applying step omits sharpness correction and noise removal from the plurality of image processes when the image is scrolled.

26. An apparatus for performing image processing by using software, comprising the steps of:
    a presenting section, arranged to present correction parameters of a plurality of image processes having different characteristics;
    a reception section, arranged to accept a change in one of correction parameters;
    a processor, arranged to apply the plurality of image processes to an image in a predetermined order using the accepted, changed correction parameter to produce a processed image; and
    an outputting section, arranged to the processed image to an image forming device,
    wherein the processor omits sharpness correction and noise removal from the plurality of image processes when the image is scrolled.

* * * * *